M7843 OR AI 090 [redacted] 'ECIFICATION AVAILABLE
[redacted]
[redacted]
B. G. H. HATHAWAY.
Thrashing Machine.
No. 90.
A. I. Patented Nov. 6, 1849.
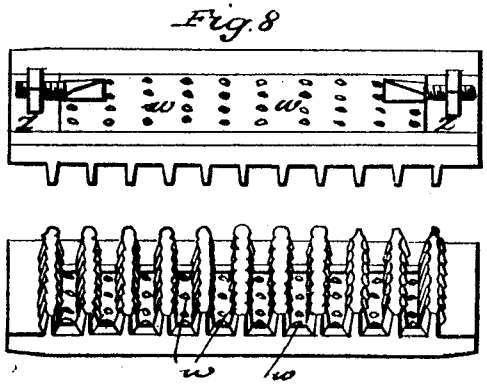
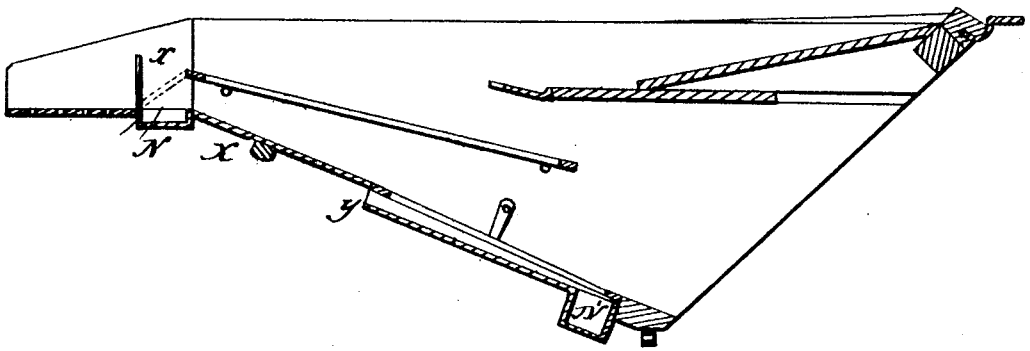
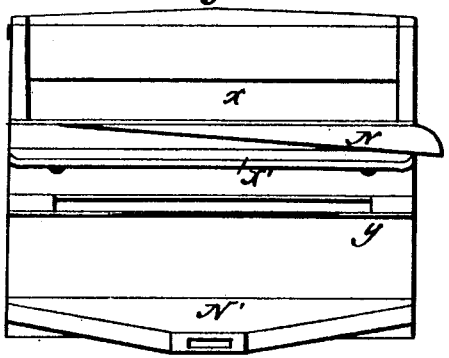
N. PETERS, Photo-Lithographer, Washington, D.C.